(12) United States Patent
Garrido Escudero et al.

(10) Patent No.: US 11,858,174 B2
(45) Date of Patent: Jan. 2, 2024

(54) METHOD FOR SEPARATING THE LAYERS OF MULTILAYER PLASTICS

(71) Applicant: REPETCO INNOVATIONS S.L., Madrid (ES)

(72) Inventors: Amalio Garrido Escudero, Murcia (ES); Alexandra Martínez Gracia, Murcia (ES); Pedro Antonio Escudero Marín, Murcia (ES)

(73) Assignee: REPETCO INNOVATIONS S.L., Madrid (ES)

( * ) Notice: Subject to any disclaimer, the term of this patent is extended or adjusted under 35 U.S.C. 154(b) by 507 days.

(21) Appl. No.: 17/264,718

(22) PCT Filed: Aug. 1, 2018

(86) PCT No.: PCT/ES2018/070541
§ 371 (c)(1),
(2) Date: Jan. 29, 2021

(87) PCT Pub. No.: WO2020/025836
PCT Pub. Date: Feb. 6, 2020

(65) Prior Publication Data
US 2021/0308909 A1 Oct. 7, 2021

(51) Int. Cl.
*B29B 17/02* (2006.01)
*B29B 17/04* (2006.01)
*B29K 67/00* (2006.01)

(52) U.S. Cl.
CPC .......... *B29B 17/02* (2013.01); *B29B 17/0412* (2013.01); *B29B 2017/0203* (2013.01); *B29B 2017/0217* (2013.01); *B29K 2067/003* (2013.01)

(58) Field of Classification Search
CPC .... B29B 2017/0203; B29B 2017/0231; B29B 2017/0227; B29B 2017/0217; B29B 17/0412; Y02W 30/625; Y02W 30/62
See application file for complete search history.

(56) References Cited

U.S. PATENT DOCUMENTS

| 4,199,109 A * | 4/1980 | Watanabe ................ B03C 7/00 |
| | | 241/23 |
| 4,728,045 A | 3/1988 | Tomaszek |
| 6,680,097 B1 | 1/2004 | Amberger et al. |

FOREIGN PATENT DOCUMENTS

| CN | 203331074 | 12/2013 |
| EP | 0215474 | 3/1987 |

(Continued)

OTHER PUBLICATIONS

W.R. Broughton et al., "Review of Life Prediction Methodology and Adhesive joint Design and Analysis Software", National Physical Laboratory, NPL Report CMMT(A) 62: 1-27 (1997).

(Continued)

*Primary Examiner* — Bobby Yeonjin Kim
(74) *Attorney, Agent, or Firm* — Merchant & Gould P.C.

(57) ABSTRACT

A system and method are for separating the layers of multilayer plastics, the fragments of multilayer plastic being carried into a receptacle (1) pressurized for 10 to 60 seconds. The receptacle is pressurized using overheated vapor generated in a boiler and introduced into the receptacle until reaching a pressure between 1 and 12 bar and a temperature between 100 and 191.12° C. The fragments are then carried to a discharge tank at a relative pressure between −0.7 and 0.1 bar and at a temperature between 15 and 25° C. for between 1 and 5 minutes. The multilayer fragments are later transferred to a mechanical separation unit where the frag- (Continued)

ments are separated into fragments of single-layer plastic and, lastly, to a mechanical sorting unit where the fragments are sorted by material.

10 Claims, 3 Drawing Sheets

(56) References Cited

FOREIGN PATENT DOCUMENTS

| | | | |
|---|---|---|---|
| EP | 0530662 | 3/1993 | |
| ES | 2539050 S | 6/2015 | |
| GB | 2467528 | 8/2010 | |
| WO | 91/03515 | 3/1991 | |
| WO | 03/025101 A2 | 3/2003 | |
| WO | WO-03025101 A2 * | 3/2003 | ............. A61L 11/00 |
| WO | 2006/106309 | 10/2006 | |
| WO | 2015/058184 | 4/2015 | |
| WO | 2017/037260 | 3/2017 | |

OTHER PUBLICATIONS

"Durability of Adhesive Bonds", Chapter 10, Adhesives Technology Handbook, Second Edition, edited by S. Ebnesajjad: 231-272 (2009).
International Search Report for PCT/ES2018/070541, dated Mar. 13, 2019.
Third Party Observation for PCT/ES2018/070541, filed Nov. 30, 2020.

* cited by examiner

METHOD FOR SEPARATING THE LAYERS OF MULTILAYER PLASTICS

This application is a National Stage application of PCT/ES2018/070541, filed Aug. 1, 2018, which application is incorporated herein by reference. To the extent appropriate, a claim of priority is made to the above-disclosed application.

FIELD OF THE INVENTION

The present invention relates to a method for separating the layers of multilayer plastics.

BACKGROUND OF THE INVENTION

Multilayer plastics are currently used in many activities and fields such as agriculture, industry and packaging. Growing environmental concerns have resulted in a generalised trend toward integral management of a product's lifetime, including recycling and recovery of its useful parts, allowing a subsequent use of the materials recovered in new products and a reduction in waste, pollution and costs.

There are several methods for recycling items made from multilayer materials, and specifically items in which at least one layer is a plastic. The methods comprise a first stage for weakening the union between layers, that is, the adhesive, and a second stage for separating the layers physically and/or chemically. The first stage requires direct heating of the fragments of the multilayer plastic. These fragments are obtained by a preliminary stage of shredding the items to reduce the size of the items to a size suitable for processing by a recycling method. The second stage usually requires reacting a chemical with a part of the multilayer plastic fragments, dissolving the adhesive or one of the layers of the multilayer plastic fragments. The second stage can also include, as an alternative or together with the chemical separation, a physical separation of the layers of the multilayer plastic fragments by crushing, grinding, polishing, cutting, and using abrasive substances. Normally a subsequent drying stage is needed to eliminate traces of water and any remaining fluid from the second stage.

These recycling methods have several drawbacks:
  They require a lot of energy, as the mass of multilayer plastic fragments to recycle must be heated to temperatures above 80° C. to weaken the adhesive, and then the separated plastics are dried.
  They need chemical compositions that are toxic and polluting and which therefore require special treatment and disposal methods.
  They need abrasive substances which require special handling and disposal methods.
  The full process needs considerable resources, as it requires several substances such as chemical compositions that are used only once.

SUMMARY OF THE INVENTION

The objective of the invention is to provide a method for separating the layers of multilayer plastics that solves the aforementioned drawbacks.

The invention provides a method for separating the layers of multilayer plastics, which comprises at least a first layer and a second layer of different plastics, which uses a system for separating the layers of multilayer plastics, the system comprising:

an input hopper for introducing the multilayer plastic fragments,
a vessel placed after the input hopper,
a discharge tank placed after the vessel,
a mechanical recompression machine connected to the discharge tank,
a pump connected to the discharge tank,
a boiler connected to the vessel and to the mechanical recompression machine,
a mechanical separation unit placed after the discharge tank,
a mechanical sorting unit placed after the mechanical separation unit,
a valve between the input hopper and the vessel, a discharge valve between the vessel and the discharge tank, a recovery valve between the discharge tank and the mechanical recompression machine, a valve between the discharge tank and the pump, and an inlet control valve between the boiler and the vessel, the method comprising the following stages:

pressurising the vessel with preheated vapour generated in a boiler and introduced into the vessel until the interior of the vessel reaches a pressure of between 1 bar and 12 bar, and a temperature between 100° C. and 191.12° C.,
taking the interior of the discharge tank placed after the vessel to a relative pressure of between −0.7 bar and 0.1 bar, and a temperature between 15° C. and 25° C.,
shredding the multilayer plastics into multilayer plastic fragments,
introducing the multilayer plastic fragments in the vessel and keeping them in it for a time between 10 seconds and 60 seconds, thereby weakening the union between the layers of the multilayer plastic fragments,
transferring the multilayer plastic fragments from the vessel to the discharge tank, where they are kept for a time between 1 minute and 5 minutes,
transferring the multilayer plastic fragments from the discharge tank to the mechanical separation unit, where the multilayer plastic fragments are separated into single-layer plastic fragments, and
transferring the single-layer plastic fragments from the mechanical separation unit to the mechanical sorting unit, where the single-layer plastic fragments are sorted by material,
wherein the multilayer plastic fragments of the vessel placed in the discharge tank return to the vessel to be subjected again to the stage of keeping them for a time between 10 seconds and 60 seconds, weakening the union between the layers of the multilayer plastic fragments.

The use of superheated vapour in the method of the invention, in addition to saving energy, allows a simultaneous application in the vessel of high pressures and temperatures for short periods that promote the separation of the various plastic layers.

Other advantageous embodiments of the invention are described in the dependent claims.

DETAILED DESCRIPTION OF THE INVENTION

Figure 1:
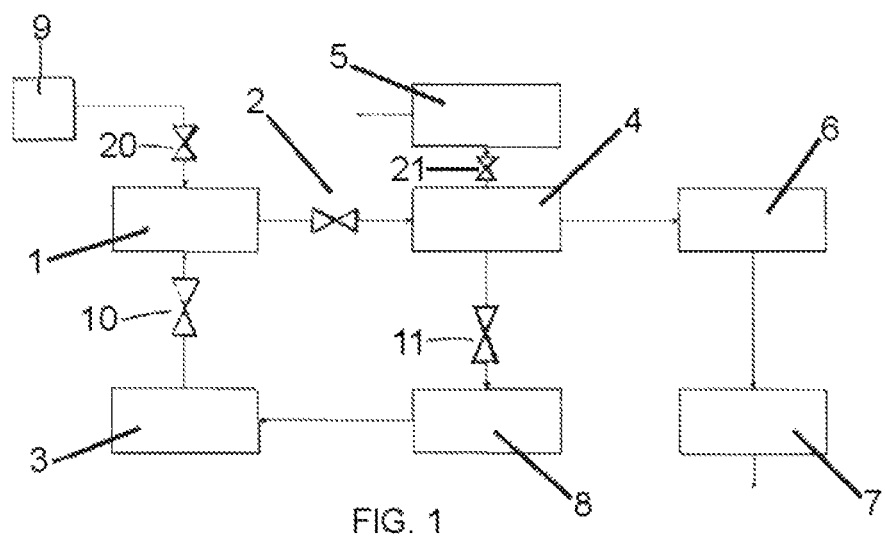
FIG. 1 shows a schematic representation of the arrangement of the elements of the system for separating the layers of the multilayer plastics of the invention.

Multilayer plastics have at least a first layer and a second layer of different plastics, and may comprise additional layers of other plastics.

The plastic layers are normally joined by an adhesive placed between two plastic layers.

In this text the term 'vacuum' refers to both an absolute vacuum, in which the absolute pressure is zero, and a relative vacuum, in which the pressure is lower than a reference pressure. To specify when necessary which of the two vacuums is referred to in a phrase, the term "absolute" or "relative" is used explicitly.

The multilayer plastics are shredded into multilayer plastic fragments by any mechanical means. In one embodiment the final size of the fragments, measured in their greater length, is not less than 10 mm.

The superheated vapour causes heat shock that does not necessarily heat the entire particle to a specified temperature, and mechanical shock due to the sudden pressure change to which the plastic layers are subjected when passing from atmospheric pressure to working pressure, allowing a successful separation of the layers in the mechanical separation stage. The vapour exerts pressure on the fragments, weakening and breaking the chemical bonds between the layers. Since only vapour is heated, energy is saved and no chemical products are required.

The temperature and pressure conditions inside the vessel and the discharge tank remain constant by means of the boiler, valves, pumps or other control means. This prevents energy losses and increases productivity, since the vessel and the tank are permanently ready to receive multilayer plastic fragments.

The vessel can be connected to a discharge tank by a discharge valve or another control means. The pressurisation and vacuum cycles consist in the introduction of the multilayer plastic fragments in the vessel, as it contains superheated vapour at a specific temperature and pressure according to the types of plastics to treat, using a valve or other control means, keeping them inside for a predetermined time depending on the types of plastic to treat. Then, minimising the pressure and temperature losses using valves or other control means and making use of the pressure differences between the vessel and the discharge tank, the multilayer plastic fragments are transferred to the discharge tank, which is at a specific temperature and pressure conditions according to the types of plastics to treat and lower than the pressure and temperature conditions inside the vessel, keeping them inside for a predetermined time depending on the types of plastics to treat.

These pressurisation and vacuum cycles can be repeated one or several times depending on the types of plastic and other properties of the multilayer plastic fragments, returning the multilayer plastic fragments through valves and other control means from the discharge tank to the vessel.

As can be seen, the application of pressure and high temperature in the vessel is simultaneous by means of the action of the superheated vapour. Similarly, the application in the discharge tank of a vacuum and a low temperature is also simultaneous.

This type of pressurisation and vacuum cycle increases the pressure difference withstood by the multilayer plastic fragments, compressing and decompressing the layers and generating tensile, compressive, and shear forces between them which further weaken the union between the layers. A further advantage of this pressurisation and vacuum cycle is that the layers dry during the vacuum stage, eliminating the subsequent drying stage.

This temperature difference damages and breaks the unions between the plastic layers, and leads to structural and surface tensions between the unions due to the differences in the thermal expansion coefficients of the unions and the plastics. Moreover, the molecular structure of the plastics is modified, causing changes in volume of the unions and the plastic layers, which in turn further deteriorate the union.

During the processing of the multilayer plastic fragments, specifically during their entry and outlet from the vessel, vapour may be lost. To correct this deviation from the predetermined conditions, a valve is provided that communicates the vessel and the boiler and is managed by a control system. The control system manages the opening of the valve to allow vapour inlet to the vessel in order to maintain the predetermined pressure and temperature conditions constant inside the vessel.

During the processing of the multilayer plastic fragments, specifically during their entry and outlet from the discharge tank, superheated vapour from the vessel may enter said tank. To correct this deviation from the predetermined conditions, a valve and a pump are provided so that the valve connects the pump and the discharge tank. The pump maintains the predetermined pressure and temperature conditions inside it, extracting fluid from inside the discharge tank.

To maximise the yield of the method, the fluid extracted by the pump from the discharge tank can be re-compressed and used in other parts of the process.

The invention comprises a mechanical separation stage of the plastic layers of the fragments to obtain single-layer plastic fragments, which are therefore also single-component fragments. The unions have been weakened enough to allow a mechanical separation of the layers. This separation comprises the actions of cutting, brushing, polishing and rubbing the fragments.

Finally, once the fragments have been separated into single-layer fragments, they are introduced into a unit for mechanical separation of the layers, where they are classified according to their composition making use of the different densities of the plastics, by placing the single-layer fragments in a controlled air stream.

In one embodiment one of the layers of the multilayer plastics is polyethylene terephthalate (PET) and another of the layers is polyethylene (PE). However, the method is suitable for separating layers of any other plastic materials.

Figure 2:
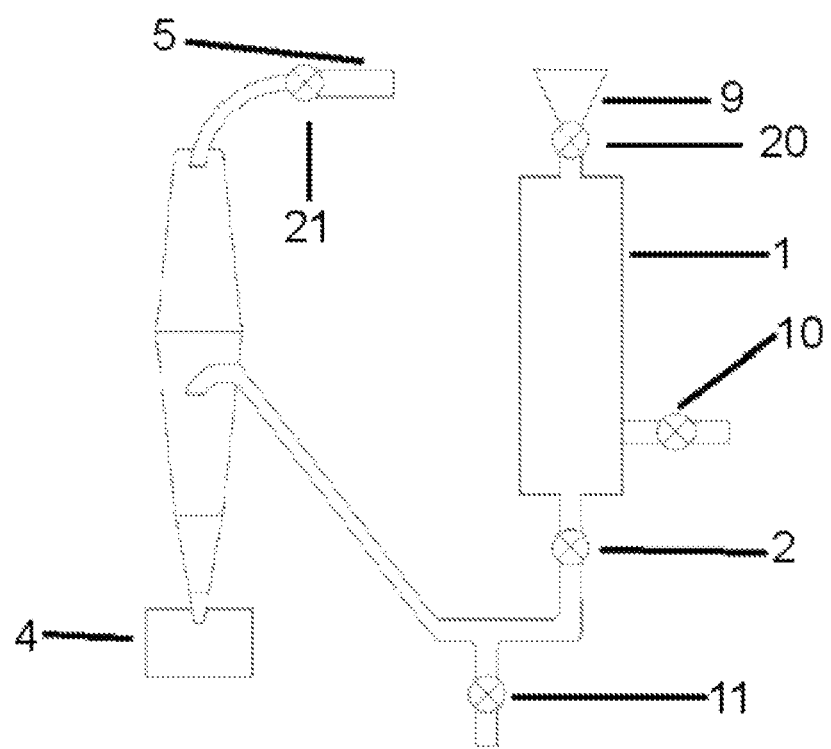
FIG. 2 shows a partial schematic view of the installation used to separate the layers of the multilayer plastics of the invention.

With reference to FIGS. 1 and 2, the vessel (1) comprises internal pressure and temperature sensors that provide data on these magnitudes to a control system. This control system controls these variables by acting on control valves, namely the vapour inlet control valve (10), discharge valve (2) of the vessel (1), and the discharge valve (20) of the hopper (9), as well as on the boiler (3), controlling its internal temperature.

The composition of the superheated vapour is water.

The boiler (3) produces steam by any heating method (such as electrical resistance, microwaves). The boiler (3) is controlled by the control system so that it produces superheated steam with the required characteristics for the types of plastic to treat.

Initially, before introducing the first batch of fragments, the boiler (3) is turned on, producing superheated steam. The valve (10) is opened to allow the superheated steam to pass to the vessel (1) until reaching predetermined pressure and temperature conditions (pressure: 1-12 bar; temperature: 100-191.12° C.). These conditions are kept constant throughout the time of application of the separation method for all the fragments to treat.

The discharge tank (4) is seamlessly connected to a pump (5) via a valve (21). The pump (5) maintains constant relative vacuum conditions of −0.7 bar to 0.1 bar (with respect to ambient pressure) inside the discharge tank (4), which are maintained during the application of the separation method for the entire quantity of fragments to treat. The temperature in the discharge tank (4) will be between 15-25° C.

When the pressure and temperature conditions in the vessel (1) and in the discharge tank (4) are as predetermined, after obtaining the multilayer plastic fragments with a size greater than 10 mm from the multilayer plastics, they are introduced into the vessel (1) through an input hopper (9) by opening the valve (20) located at the outlet of the input hopper (9).

The fragments are then kept for a specified time in the vessel (1), where they are subjected to the high temperature and pressure of the superheated steam. If the layers are made from PET and PE, this time is preferably between 10 seconds and 60 seconds.

After this time, the discharge valve (2) of the vessel (1) is opened and the fragments pass to the discharge tank (4), where they are kept for a predetermined time (between 1 and 5 minutes) and subjected to the relative vacuum and lower temperature inside it. If the layers are made from PET and PE, this time is preferably 5 minutes. After the predetermined time in these relative vacuum conditions, the fragments are taken to a mechanical separation unit (6).

The steam that may have entered the discharge tank (4) is extracted through a recovery valve (11) that connects it to a mechanical recompression machine (8). The resulting condensed water is filtered and reintroduced into the boiler (3).

After the vacuum time has passed, the fragments are transferred to a mechanical separation unit (6).

Figure 3:
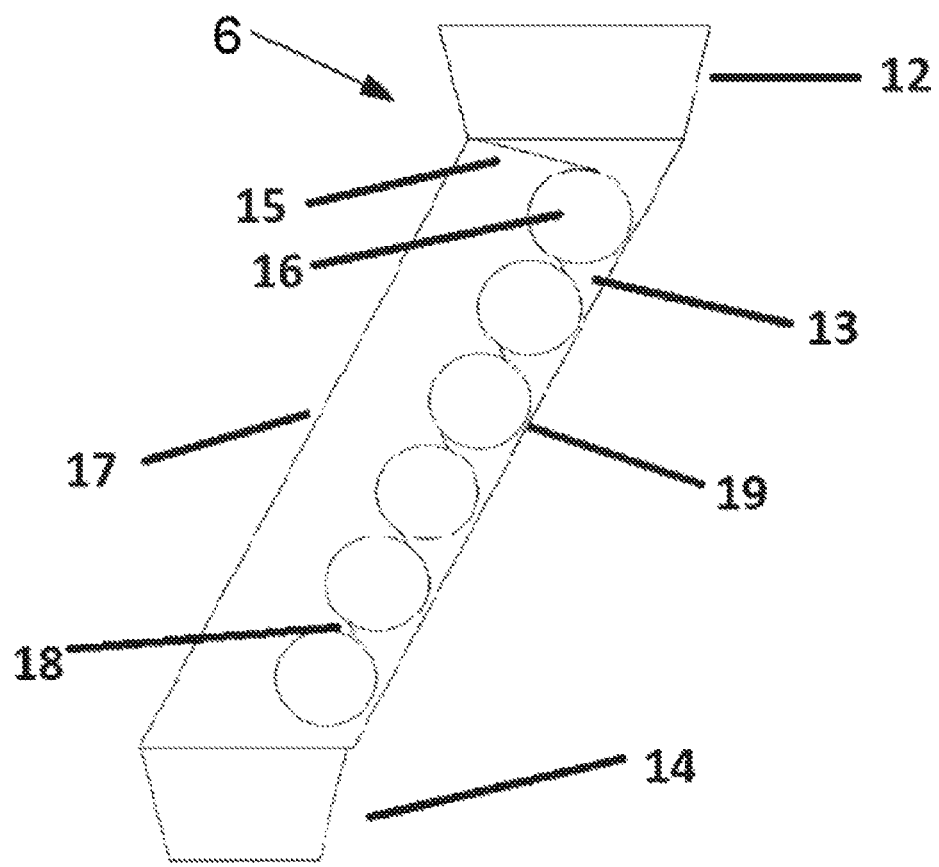
FIG. 3 shows an embodiment of a mechanical separation unit used in the system for separating the layers of the multilayer plastics of the invention.

The mechanical separation unit (6), shown in FIG. 3, comprises means for polishing, cutting, brushing and rubbing the multilayer plastic fragments against each other to obtain single-layer fragments made from a single type of plastic. These means consist of one or more drums (16) that rotate about an axis inside a chamber (17). Some drums (16) comprise a rough surface that peels and polishes the fragments. Other drums (16) comprise a surface covered with metal rods placed perpendicular to the surface of the drum. The cut is therefore made without requiring blades or any other sharp elements. The drums (16) are arranged in a straight line, one after the other, leaving a small space (19) between the point closest to its surface and one of the surfaces of the chamber (17) and this surface of the chamber (17), preferably a distance of 0.8 mm, to promote friction between the fragments and the surfaces of the drums (16). This space (19) can be adjusted by moving the roller towards or away from the surface of the chamber (17), or by moving the surface of the chamber (17) closest to the drums (16) towards or away from the drums (16). The row of drums (16) is arranged to form an angle close to 60° to the floor. The drums (16) comprise a barrier (18) placed between every two drums (16), the drums (16) defining the wall of the chamber (17) closest to them and the barriers (18) defining a separation volume (13) open only by an input hopper (12) located at the upper end of the chamber (17) and an outlet hopper (14) located at the bottom end of the chamber (17), so that the fragments move only under gravity from the input hopper (12) through the volume (13), without passing to another volume of the chamber (17).

The input hopper (12) comprises a wall (15) that directs the fragments towards the separation volume (13).

The fragments are introduced into the separation unit (6) from the input hopper (12), falling as a result of gravity through the chamber (17), specifically from the separation volume (13), receiving the action of the drums (16). As they fall, the layers are separated from each other and the remaining moisture is eliminated by the stirring action. Finally, once separated into single-layer fragments, they leave through the outlet hopper (14).

The outlet hopper (14) is connected to the mechanical classification unit (7). The mechanical classification unit (7) comprises a vibration table, an aspirator and a cyclone. The particles are transferred to the table. The action of the vibration table in combination with a controlled suction by the aspirator separates the fragments according to their density, suctioning the lighter phase and leaving on the table the heavier phase, thereby separating the fragments according to their composition.

The invention claimed is:

1. A method for separating layers of multilayer plastics that comprise at least a first layer and a second layer made of different plastics, which uses a system for separating the layers of multilayer plastics, the system comprising:
    an input hopper for introducing multilayer plastic fragments,
    a vessel placed after the input hopper,
    a discharge tank placed after the vessel,
    a mechanical recompression machine connected to the discharge tank,
    a pump connected to the discharge tank,
    a boiler connected to the vessel and to the mechanical recompression machine,
    a mechanical separation unit placed after the discharge tank,
    a mechanical sorting unit placed after the mechanical separation unit,
    a valve between the input hopper and the vessel, a discharge valve between the vessel and the discharge tank, a recovery valve between the discharge tank and the mechanical recompression machine, a valve between the discharge tank and the pump, and an inlet control valve between the boiler and the vessel;
the method comprising the following stages:
pressurizing the vessel with preheated vapor generated in a boiler and introduced into the vessel until an interior of the vessel reaches a pressure of between 1 bar and 12 bar, and a temperature between 100° C. and 191.12° C.;
pressurizing an interior of the discharge tank placed after the vessel to a relative pressure of between −0.7 bar and 0.1 bar, and a temperature between 15° C. and 25° C.;
shredding the multilayer plastics into multilayer plastic fragments;
introducing the multilayer plastic fragments in the vessel and keeping the multilayer plastic fragments in the vessel for a time between 10 seconds and 60 seconds, thereby weakening bonds between the layers of the multilayer plastic fragments;
transferring the multilayer plastic fragments from the vessel to the discharge tank, where the plastic fragments are kept for a time between 1 minute and 5 minutes;
transferring the multilayer plastic fragments from the discharge tank to the mechanical separation unit, where the multilayer plastic fragments are separated into single-layer plastic fragments; and transferring the single-layer plastic fragments from the mechanical separation unit to the mechanical sorting unit, where the single-layer plastic fragments are sorted by material;

wherein the multilayer plastic fragments of the vessel placed in the discharge tank return to the vessel to be again subjected to the stage of keeping the multilayer plastic fragments for a time between 10 seconds and 60 seconds, weakening bonds between the layers of the multilayer plastic fragments.

2. The method according to claim 1, wherein the multilayer plastics are shredded into fragments so that the final size of the fragments, measured in a greatest length, is not less than 10 mm.

3. The method according to claim 1, wherein one of the layers of the multilayer plastics is made from polyethylene terephthalate (PET) and another of the layers is made from polyethylene (PE).

4. The method according to claim 1, wherein the multilayer plastic fragments are introduced into the vessel through the inlet hopper by opening the valve placed at the outlet of the inlet hopper.

5. The method according to claim 1, wherein transfer of the multilayer plastic fragments from the vessel to the discharge tank is made through the discharge valve placed between the vessel and the discharge tank.

6. The method according to claim 1, wherein the transfer of preheated vapor from the boiler to the vessel is performed through the vapor inlet control valve placed between the boiler and the vessel.

7. The method according to claim 1, wherein the pump extracts liquid from inside the discharge tank.

8. The method according to claim 7, wherein during transfer of the multilayer plastic fragments from the vessel to the discharge tank, steam is introduced into the discharge tank from the vessel; the steam is extracted through the recovery valve, which connects to the mechanical recompression machine, so that resulting condensed water is filtered and reintroduced into the boiler.

9. The method according to claim 1, wherein the vessel comprises internal pressure and temperature sensors that provide data on magnitudes of pressure and temperature to a control system, which controls the pressure and temperature by actuating the steam inlet control valve, the discharge valve and the valve, and by controlling internal temperature of the boiler.

10. The method according to claim 1, wherein in the mechanical separation unit the multilayer plastic fragments are separated into single-layer plastic fragments by actions that comprise cutting, brushing, polishing, and rubbing the fragments.

* * * * *